US006865443B2

(12) United States Patent
Snapp et al.

(10) Patent No.: US 6,865,443 B2
(45) Date of Patent: Mar. 8, 2005

(54) METHOD AND SYSTEM FOR SEQUENCING DELIVERABLES USING COMBINED DELIVERY CODES AND PARTIAL DELIVERY POINT BAR CODES (DPBCS)

(75) Inventors: Robert F. Snapp, Memphis, TN (US); David J. Payne, Collierville, TN (US); James D. Wilson, Collierville, TN (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/358,440

(22) Filed: Feb. 4, 2003

(65) Prior Publication Data

US 2003/0146138 A1 Aug. 7, 2003

Related U.S. Application Data

(60) Provisional application No. 60/354,165, filed on Feb. 4, 2002.

(51) Int. Cl.[7] .................................................. G06F 7/00

(52) U.S. Cl. ....................... 700/223; 700/224; 700/226; 209/900; 209/584

(58) Field of Search ......................... 700/223, 224–226; 209/584, 900

(56) References Cited

U.S. PATENT DOCUMENTS 5,363,971 A 11/1994 Weeks et al.
5,446,667 A 8/1995 Oh et al.
5,794,789 A 8/1998 Payson et al.
5,901,855 A * 5/1999 Uno et al. .................. 209/584
6,239,397 B1 * 5/2001 Rosenbaum et al. ........ 209/584
6,241,099 B1 * 6/2001 Hendrickson et al. ...... 209/542
6,316,741 B1 11/2001 Fitzgibbons et al.
6,598,748 B2 * 7/2003 Mileaf et al. ............... 209/542

* cited by examiner

*Primary Examiner*—Khoi H. Tran
(74) *Attorney, Agent, or Firm*—Finnegan, Henderson, Farabow, Garrett & Dunner, L.L.P.

(57) ABSTRACT

A method and system for sequencing deliverables using combined delivery codes and partial delivery point bar codes (DPBCs) provides pre-sequencing of deliverables for delivery carriers that has improved ordering with respect to the actual delivery route and accounts for un-coded new delivery points in the ordering process. A partial DPBC field is combined with a delivery code to generate the ordering sequence. The DPBC field is combined by generating delivery sequencing tables having sequence numbers splitting ZIP+4 codes into multiple entries delineated by ranges of the last two digits of the DPBC, that can then be flagged for ascending or descending delivery and assigned unique sequence numbers. The full address of actual delivery points is thereby concealed by the table, while providing more accurate sequencing conforming to actual deliver routes. New delivery points within a ZIP+4 code can be assigned a sequence number by reference to the last two digits of the actual address, providing further utility to the method.

18 Claims, 3 Drawing Sheets

METHOD AND SYSTEM FOR SEQUENCING DELIVERABLES USING COMBINED DELIVERY CODES AND PARTIAL DELIVERY POINT BAR CODES (DPBCS)

RELATED APPLICATIONS

This application is related to U.S. provisional application Ser. No. 60/354,165 filed Feb. 4, 2002 and from which it claims benefits under 35 U.S.C. §119(e).

BACKGROUND OF THE INVENTION

1. Field of the Invention

The present invention relates generally to mail and parcel delivery systems, and more specifically, to a method and system for sequencing deliverable items prior to delivery.

2. Background of the Invention

Mail and other deliverables are typically sorted prior to transport of the deliverables on a delivery route. For example, a carrier for the U.S. Postal Service sequences the mail prior to commencing delivery. If a mass mailing is provided by a delivery service customer, a discount is typically provided by the delivery service if the mail is pre-sorted. The sorting order is known as Line-of-Travel (LOT) order, which attempts to represent the actual delivery order followed by the carrier. ZIP+4 codes plus delivery point codes are codes used to identify delivery point locations.

However, there are two drawbacks to existing systems for LOT sorting. First, when a ZIP+4 code is not served in a linear ascending or descending order or when a carrier traverses between ZIP+4 codes in the service of delivery points, present LOT sorting systems may not follow the actual line-of-travel used by the carrier. Second, if a new address is added to the route without updating the delivery point file (DPF), the new address cannot be properly sequenced.

A delivery point file (DPF) is used to generate delivery sequences for LOT ordering by the U.S. Postal Service. But, because it is possible to extract an address list from a DPF file, the DPF system cannot be widely distributed. Current federal statutes provide that the USPS cannot provide address lists to unrestricted and unlicensed agents, while systems that generate a sequence number from a known address can be distributed to anyone through a controlled process.

Therefore, it would be desirable to provide a method and system for sequencing deliverables that will produce actual delivery sequences over ZIP+4 traverses and non-linear sequencing within a ZIP+4 code, and without disclosing sensitive address information. It would further be desirable to provide a method and system for sequencing deliverables whereby new addresses may be automatically sequenced without entry of the new addresses into a delivery sequence file.

SUMMARY OF THE INVENTION

The above stated objectives of sequencing deliverables to produce actual delivery sequences over ZIP+4 traverses and non-linear sequencing within a ZIP+4 code, without disclosing sensitive address information and whereby new addresses are automatically sequenced without entry of the new addresses into a delivery sequence file are achieved in a method and system. The method may be further embodied in a computer program product encoding program instructions for execution by a computer system in accordance with an embodiment of the invention.

The method sequences deliverables by assigning sequence numbers to groups of partial ZIP+4 code segments that can be delivered in ascending or descending order. The segments are determined by sub-ranges within the range of 0–99 corresponding to the last two digits of the delivery point bar code (DPBC) corresponding to the actual delivery point address. The revelation of exact delivery location points is prevented by ranges of possible delivery point numbers that are based on the last two digits of the DPBC. Since the range endpoints may or may not correspond to an actual delivery point, exact delivery points are not revealed and for all delivery points within the range, the sequencing method hides the exact delivery point with respect to actual address.

DETAILED DESCRIPTION

Figure 1:
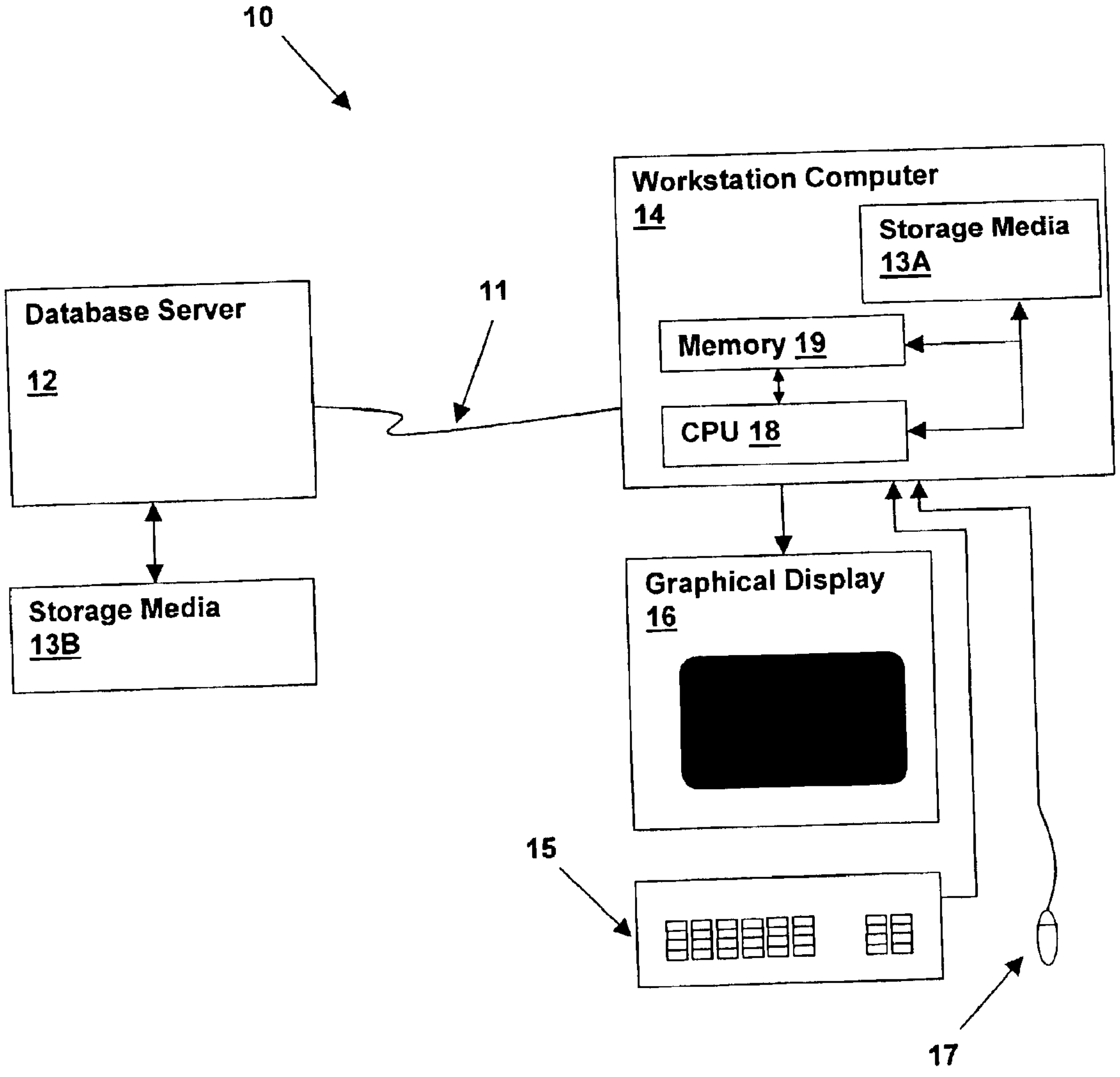
FIG. 1 is a block diagram depicting a computer system in which the present invention may be practiced.

Referring now to the figures and in particular to FIG. 1, there is depicted a computer system 10 within which a method may be performed via the execution of program instructions forming a computer program product in accordance with an embodiment of the present invention. The method may employ program instructions located within a memory 19 of a workstation computer 14 and executed by a central processing unit 18 (CPU) and the data store of the present invention may be located entirely within a storage media 13A and memory 19. Alternatively, workstation computer 14 may be coupled via a network 11 connection for coupling workstation computer 14 to a network such as a local-area network (LAN), wide-area network (WAN) or the Internet. In a network implementation, the data store and/or program instructions for implementing the methods of the present invention may be located within a database server 12 coupled to a storage media 13B.

The methods of the present invention may be entirely performed on workstation computer 14, or similar. Or, the method of sequencing may be manually performed using a table generated by said workstation computer in conformity with the method of generating a sequencing table disclosed herein. Deliverables as described herein include not only mail, but parcels, packages, newspapers, clothes, prepared food and groceries, as well as other types of items that are delivered to actual address locations and post office boxes.

The method of the present invention provides inherent data security with respect to actual street addresses being revealed, permitting distribution of a program and data store to an end-user for execution on workstation computer 14 or access to the data store and execution of the program via the Internet or other network. Other combinations such as local-hosted program with remote data store, local data store with remote-hosted program are possible and should be understood to be variations in accordance with embodiments of the present invention.

Figure 2:
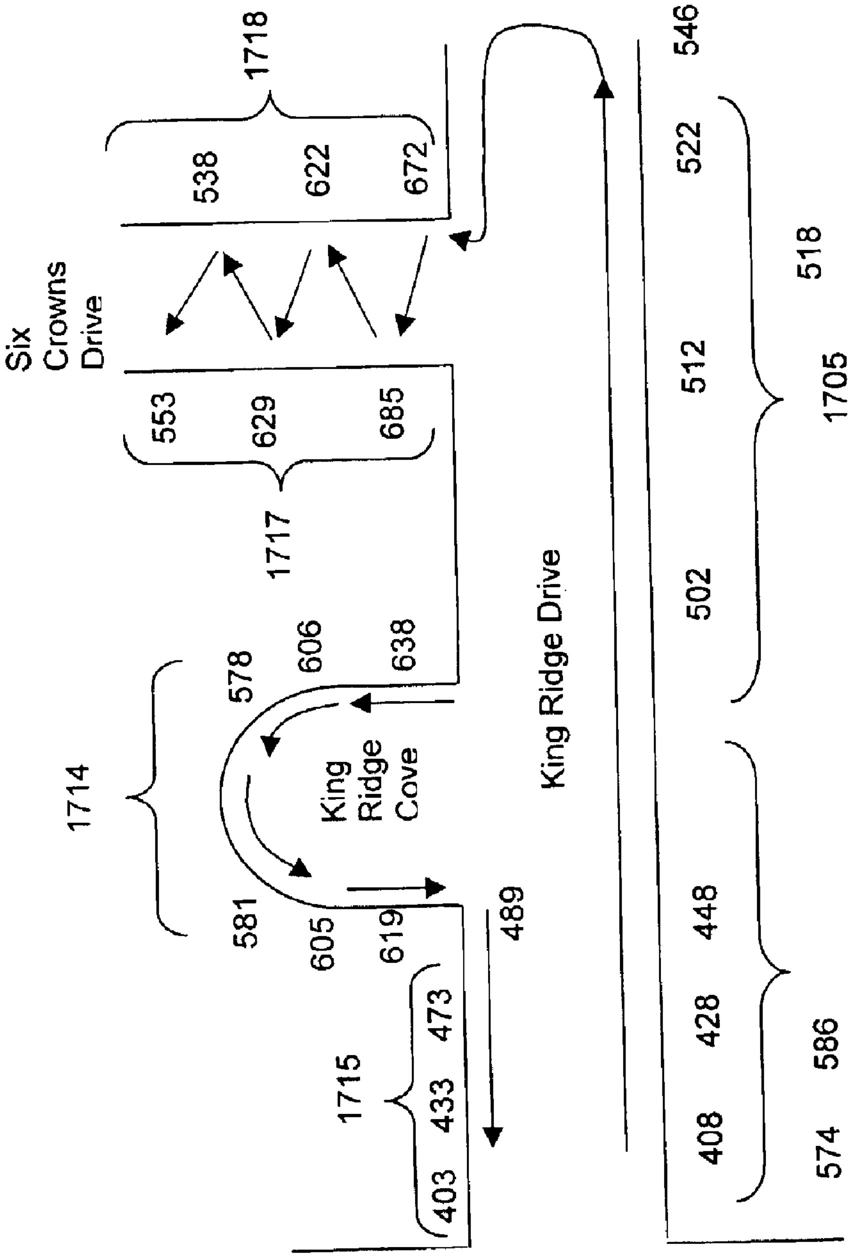
FIG. 2 is a pictorial diagram depicting a delivery route that may be served with deliverables sequenced by a method in accordance with an embodiment of the present invention.

Referring now to FIG. 2, a delivery route that may be serviced with deliverables sequenced using a method in accordance with an embodiment of the invention is depicted.

A carrier or delivery person delivers the 400–498 block of King Ridge Drive as depicted, then the 500–598 block of King Ridge Drive. The delivery route then proceeds on to Six Crowns Drive and criss-crosses between the even side and the odd side of Six Crowns Drive (since all of the odd mailboxes are on one side of the street and all of the even mailboxes are on the other). The route then proceeds for delivery to the eight houses on King Ridge Cove, beginning at 618 King Ridge Cove and ending at 619 King Ridge Cove. Finally, mail is delivered to the 499–401 block of King Ridge Drive. The illustrated route will be used to compare the mail sequencing performance of a method in accordance with an embodiment of the present invention to existing LOT sequencing methodologies.

Table 1 below shows a LOT sequence of a type presently produced LOT sequencing systems. The ZIP+4 codes correspond to the segments shown in FIG. 2 and the Ascending column shows the direction of the delivery sequence.

TABLE 1

| ZIP Code | Carrier ID | Sequence # | Ascending | Record | ZIP + 4 Code | ZIP + 4 Code |
|---|---|---|---|---|---|---|
| 38017 | C0007 | 0035 | A | S | 1716 | 1716 |
| 38017 | C0007 | 0036 | A | S | 1705 | 1705 |
| 38017 | C0007 | 0037 | D | S | 1718 | 1718 |
| 38017 | C0007 | 0038 | A | S | 1717 | 1717 |
| 38017 | C0007 | 0039 | A | S | 1714 | 1714 |
| 38017 | C0007 | 0040 | D | S | 1715 | 1715 |

Errors in sequencing produced by an existing LOT system are demonstrated by delivery on Six Crowns Drive, shown as criss-crossing (traversing) Six Crowns Drive in completely descending order, while Table 1 shows the sequence as descending for the even 698–600 even (1718 ZIP+4) segment, then ascending for the 501–699 odd (1717 ZIP+4) segment. Also, when the carrier begins delivery into King Ridge Cove (1714 ZIP+4), the actual delivery proceeds in descent through the even addresses and ascends through the odd addresses, while the sequence in Table 1 shows ascending order through all addresses. The errors stem from the route differing from linear service of individual ZIP+4 codes in a single ascending or descending direction (e.g., the traversal of Six Crowns Drive and the service of King Ridge Cove).

If an existing Delivery Point File (DPF) were used to sequence the deliverables, the sequencing could be performed correctly, however not only is the DPF not generally distributable, but if a new delivery location actually existed, for example, at 518 King Ridge Drive, it would not be sequenced if the location was absent from the DPF product at the time it was coded. The present invention overcomes the above limitations and removes the errors by reconstruction of the LOT data and by incorporating the last two digits of the DPBC of the actual delivery address in the sequencing method, while not requiring divulgence of a database that could be used to "mine" actual address location information.

To illustrate the method, consider delivery sequencing of the first segment illustrated in FIG. 2 (1716 ZIP+4 segment). First the ZIP code and ZIP+4 code is determined (a function routinely performed using address-matching software) then, a lookup into a special enhanced line-of-travel (ELOT) lookup table is performed. Using the ZIP code, ZIP+4 code, Carrier ID and Delivery Point Bar Code (DPBC) number assigned by the U.S. Postal Service, the lookup locates the record or line in which the first three Items match and the last two digits of the DPBC fit within the range of the lowest and highest DPBCs. A sort sequence number is then assigned by using the ELOT lookup table and direction of delivery (ascending or descending) is also determined from a flag in the lookup table. For the 1716 ZIP+4 segment, the sequence is shown as ascending and the sequence number for the entire segment is 0035, as illustrated in Table 2, which provides an exemplary portion of an ELOT for the route depicted in FIG. 2 in accordance with the present invention. The ELOT table differs from the prior LOT table in that the DP low and the DP high field allow the splitting of ZIP+4 segments into ranges of addresses, without specifying unique addresses. Once the segments are split, sequencing can be flagged for ascending or descending order. The use of ranges also permits the insertion of new delivery points within the range that are not coded into a DPF file.

Similar sequencing occurs for the 500–598 block of King Ridge Drive (ZIP+4 segment 1705) and a new delivery point at 518 King Ridge Drive is handled by the table, as the address will fall within sequence number 00036, as will any address in that segment since all addresses will have the last two digits of their DPBC fall within the range of DP low 00 to DP high 99.

TABLE 2

| ZIP Code | Carrier ID | ZIP + 4 High | ZIP + 4 Low | DP Low | DP High | Ascending | Sequence # |
|---|---|---|---|---|---|---|---|
| 38017 | C0007 | 1705 | 1705 | 00 | 99 | A | 00036 |
| 38017 | C0007 | 1714 | 1714 | 00 | 05 | A | 00048 |
| 38017 | C0007 | 1714 | 1714 | 06 | 07 | A | 00044 |
| 38017 | C0007 | 1714 | 1714 | 08 | 16 | A | 00046 |
| 38017 | C0007 | 1714 | 1714 | 17 | 18 | A | 00043 |
| 38017 | C0007 | 1714 | 1714 | 19 | 50 | A | 00049 |
| 38017 | C0007 | 1714 | 1714 | 51 | 79 | A | 00045 |
| 38017 | C0007 | 1714 | 1714 | 80 | 99 | A | 00047 |
| 38017 | C0007 | 1715 | 1715 | 00 | 99 | D | 00050 |
| 38017 | C0007 | 1716 | 1716 | 00 | 99 | A | 00035 |
| 38017 | C0007 | 1717 | 1717 | 00 | 30 | A | 00040 |
| 38017 | C0007 | 1717 | 1717 | 31 | 55 | A | 00042 |
| 38017 | C0007 | 1717 | 1717 | 55 | 99 | A | 00038 |
| 38017 | C0007 | 1718 | 1718 | 50 | 99 | A | 00037 |
| 38017 | C0007 | 1718 | 1718 | 00 | 31 | A | 00039 |
| 38017 | C0007 | 1718 | 1718 | 32 | 49 | D | 00041 |

Sequencing for delivery points on Six Crowns Drive (ZIP+4 segments 1717 and 1718). Note that each of the two segments is into ranges by the ELOT table and that the sequence numbers are ordered to handle the traversal of the segment. Thus 672 Six Crowns Drive has a sequence number of 0037 (72 falls within the range of 50–99), which is the first delivery, 685 has a sequence number of 0038 (85 falls within the range of 55–99), etc.

The ZIP+4 High and ZIP+4 Low fields are provided for sequencing of blocks of post office boxes where each box has its own unique ZIP+4 code, but can be sequenced in a block, further providing protection for address location information by combining ZIP+4 codes into ranges for situations where each ZIP+4 code corresponds to a unique delivery location.

Thus, any address may be properly sequenced and no disclosure of specific addresses occurs. The use of ranges provides ranges that shield the sensitive address information. In cases where the address range is too small to be encapsulated by an artificial range, there may be isolated cases where an actual address is disclosed. Nevertheless, overall the method and system of the present invention represents a significant improvement in sequencing, while providing security for address information.

Figure 3:
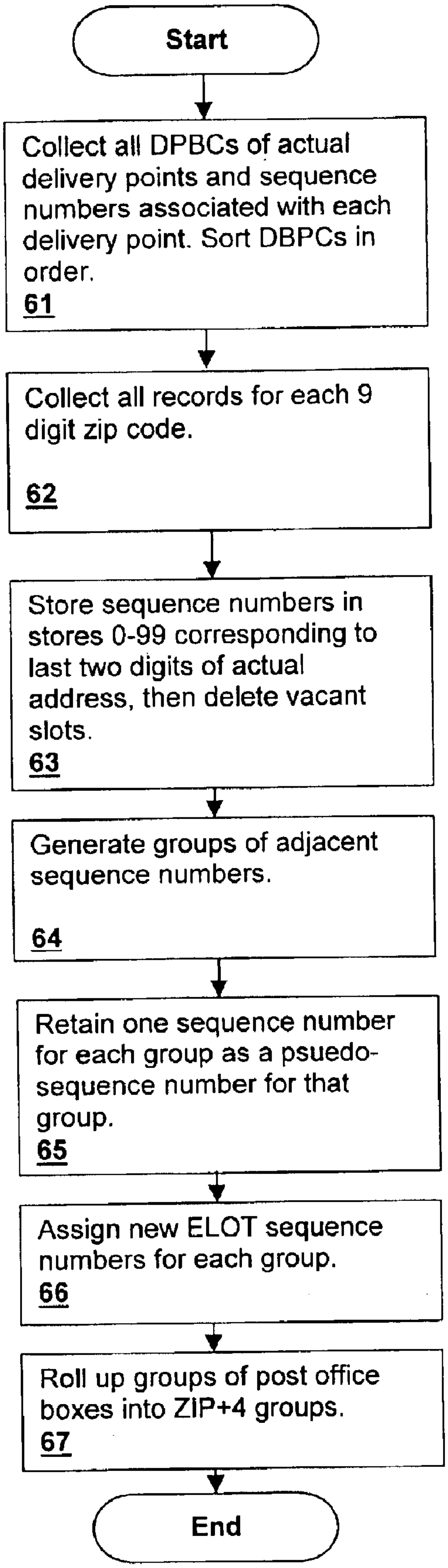
FIG. 3 is a flowchart depicting operation of the system executing a method in accordance with an embodiment of the present invention.

While the above ELOT table may be generated by any means, including manual means by the carrier or other person and the present invention contemplates the sequencing of deliverables by a table such as the above-described ELOT table, a method for generating such ELOT table in accordance with an embodiment of the invention is described below. Referring now to FIG. 3, a method for automatically generating an ELOT table is disclosed. First, a delivery point file is processed to produce a new file containing all 11-digit DPBCs of actual deliveries and associated actual delivery sequence numbers and the new file is sorted by DPBC (step 61). Then, individual records are collected for each specific 9-digit ZIP and ZIP+4 code (step 62). Next, the sequence numbers are placed into stores (arrays, linked lists, etc.) associated with each of a slot from 00–99 corresponding to the last two digits of the actual DPBC and vacant slots are deleted (step 63). The sequence numbers are then scanned for adjacent delivery sequence numbers in ascending or descending order and contiguous sequences are grouped (step 64). Then, all but one sequence number is deleted, with the retained sequence number used as a representative pseudo delivery sequence number used to represent the particular group (step 65). Finally, when the process above is complete for an entire 9-digit ZIP and ZIP+4 code, the pseudo delivery sequence numbers are sorted and a new unique ELOT sequence number (starting at 1 for each new ZIP code delivered by the carrier) is assigned (step 66).

A second pass on the data is made to look for groups of ascending 9-digit ZIP and ZIP+4 codes with corresponding ascending delivery sequence numbers, indicating groups of post office boxes. The second pass "rolls up" the box numbers into a single sequence number (step 67), generating ranges of ZIP+4 codes for the boxes so that individual box ZIP+4 codes are not revealed in the ELOT table. Note is taken of any skips in the ZIP+4 sequence, so that unused ZIP+4 codes are not assigned to another carrier.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for sorting deliverables, comprising:

receiving a deliverable having a delivery point bar code (DPBC) associated with an actual delivery point address;

determining a ZIP+4 number for said actual delivery point address;

extracting a DPBC field from the delivery point bar code (DPBC); and sequencing said received deliverable in conformity with a sequence number corresponding to a delivery point group identified by a DPBC field range of numbers encompassing said DPBC field and said ZIP+4 number.

2. The method of claim 1, wherein the DPBC field is associated with the lower two digits of the delivery point address.

3. The method of claim 1, further comprising ordering said sequence number in conformity with an actual delivery point sequence file.

4. The method of claim 1, further comprising assigning sequence numbers to one or more DPBC field ranges of numbers within a maximum DPBC field range of said DPBC field, wherein each sequence number includes an ascending or descending attribute.

5. The method of claim 4, wherein said assigning includes assigning unique sets of DPBC field ranges of numbers within a unique ZIP+4 code.

6. The method of claim 1, further comprising assigning groups including a ZIP+4 range of ZIP+4 numbers to sets of post office boxes, wherein DPBC field ranges of numbers of said groups are set to a maximum DPBC range of said DPBC field ranges, whereby ZIP+4 codes corresponding to unique delivery point addresses are protected.

7. A computer system comprising a processor for executing program instructions and a memory coupled to said processor for storing said program instructions and data, wherein said program instructions comprise program instructions for:

receiving a deliverable having a delivery point bar code (DPBC) associated with an actual delivery point address;

determining a ZIP+4 number for said actual delivery point address;

extracting a DPBC field from the delivery point bar code (DPBC); and sequencing said received deliverable in conformity with a sequence number corresponding to a delivery point group identified by a DPBC field range of numbers encompassing said DPBC field of said actual delivery point address and said ZIP+4 number.

8. The computer system of claim 7, wherein said program instructions further comprise program instructions for forming said DPBC field from the lower two digits of the DPBC.

9. The computer system of claim 7, wherein said program instructions further comprise program instructions for ordering said sequence number in conformity with an actual delivery point sequence file.

10. The computer system of claim 7, wherein said program instructions further comprise program instructions for assigning sequence numbers to DPBC field ranges of numbers within a maximum DPBC field range of said DPEC field, wherein each sequence number includes an ascending or descending attribute.

11. The computer system of claim 10, wherein said program instructions further comprise program instructions for assigning unique sets of DPBC field ranges of numbers within a unique ZIP+4 code.

12. The computer system of claim 7, wherein said program instructions further comprise program instructions for assigning groups including a ZIP+4 range of ZIP+4 numbers to sets of post office boxes, wherein DPBC field ranges of said groups are set to a maximum DPBC field range of said DPBC field ranges, whereby ZIP+4 codes corresponding to unique delivery point addresses are protected.

13. A computer program product comprising signal-bearing media encoding program instructions and data for execution within a general-purpose computer system, wherein said program instructions comprise program instructions for:

receiving a deliverable having a delivery point bar code (DPBC) associated with an actual delivery point address;

determining a ZIP+4 number for said actual delivery point address;

extracting a DPBC field from the delivery point bar code (DPBC); and sequencing said received deliverable in conformity with a sequence number corresponding to a delivery point group identified by a DPBC field range of numbers encompassing said DPBC field and said ZIP+4 number.

14. The computer program product of claim 13, wherein said program instructions further comprise program instructions for forming said DPBC field from the lower two digits of the actual delivery point address.

15. The computer program product of claim 13, wherein said program instructions further comprise program instructions for ordering said sequence number in conformity with an actual delivery point sequence file.

16. The computer program product of claim 13, wherein said program instructions further comprise program instructions for assigning sequence numbers to DPBC field ranges of numbers within a maximum DPBC field range of said DPBC field, wherein each sequence number includes an ascending or descending attribute.

17. The computer program product of claim 16, wherein said program instructions further comprise program instructions for assigning unique sets of DPBC field ranges within a unique ZIP+4 code.

18. The computer program product of claim 13, wherein said program instructions further comprise program instructions for assigning groups including a ZIP+4 range of ZIP+4 numbers to sets of post office boxes, wherein DPBC field ranges of said groups are set to a maximum DPBC field range of said DPBC field ranges, whereby ZIP+4 codes corresponding to unique delivery point addresses are protected.

* * * * *